United States Patent [19]

Shimizu

[11] Patent Number: 5,220,556
[45] Date of Patent: Jun. 15, 1993

[54] OPTICAL DISK WITH IDENTIFICATION PHASE-ENCODED AREA

[75] Inventor: Akihiko Shimizu, Yokohama, Japan

[73] Assignee: Ricoh Company, Ltd., Tokyo, Japan

[21] Appl. No.: 603,480

[22] Filed: Oct. 25, 1990

[30] Foreign Application Priority Data

Oct. 27, 1989 [JP] Japan .................... 1-280403

[51] Int. Cl.$^5$ .................... G11B 7/013; G11B 7/24
[52] U.S. Cl. .................... 369/275.1; 369/275.3; 369/275.4; 369/109
[58] Field of Search .............. 369/275.1, 275.3, 275.4, 369/277, 109, 279, 13, 111; 360/59, 114; 365/122

[56] References Cited

U.S. PATENT DOCUMENTS

| | | | |
|---|---|---|---|
| 4,230,915 | 10/1980 | Dil et al. | 369/275.4 |
| 4,325,135 | 4/1982 | Dil et al. | 369/275.4 |
| 4,586,173 | 4/1986 | Ando | 360/109 |
| 4,759,006 | 7/1988 | Koishi et al. | 369/111 |
| 4,868,808 | 9/1989 | Tinet | 369/275 |
| 4,893,298 | 1/1990 | Pasman et al. | 369/275.4 |

FOREIGN PATENT DOCUMENTS

| | | | |
|---|---|---|---|
| 56-90437 | 7/1981 | Japan | 369/275.4 |
| 61-243974 | 10/1986 | Japan | 369/13 |
| 01-37745 | 2/1989 | Japan | 369/13 |

*Primary Examiner*—Hoa T. Nguyen
*Attorney, Agent, or Firm*—Cooper & Dunham

[57] ABSTRACT

An optical disk having a recording area and an identification phase-encoded part (PEP) area with pits from which system data on the optical disk is reproduced without tracking, in which when the track pitch for the PEP area and the track pitch for the recording area are the same, the relationship between the track pitch P in the PEP area and the width W of the pits measured at a height in the pits of half the pit depth D is set in the range of $0.4P \leq W \leq 0.6P$; and when the track pitch for the PEP area and the track pitch for the recording area are different, the relationship between the track pitch P in the PEP area and the width W of the pits measured at a height in the pit of half the pit depth D is set in the range of $P \leq 2.5W$.

2 Claims, 4 Drawing Sheets

X: INTERVAL BETWEEN TRACK CENTER AND BEAM POSITION (xP)

X: INTERVAL BETWEEN TRACK CENTER AND BEAM POSITION (xP)

BEAM SCANNING·TRACK-ON STATE

BEAM SCANNING·TRACK-OFF STATE

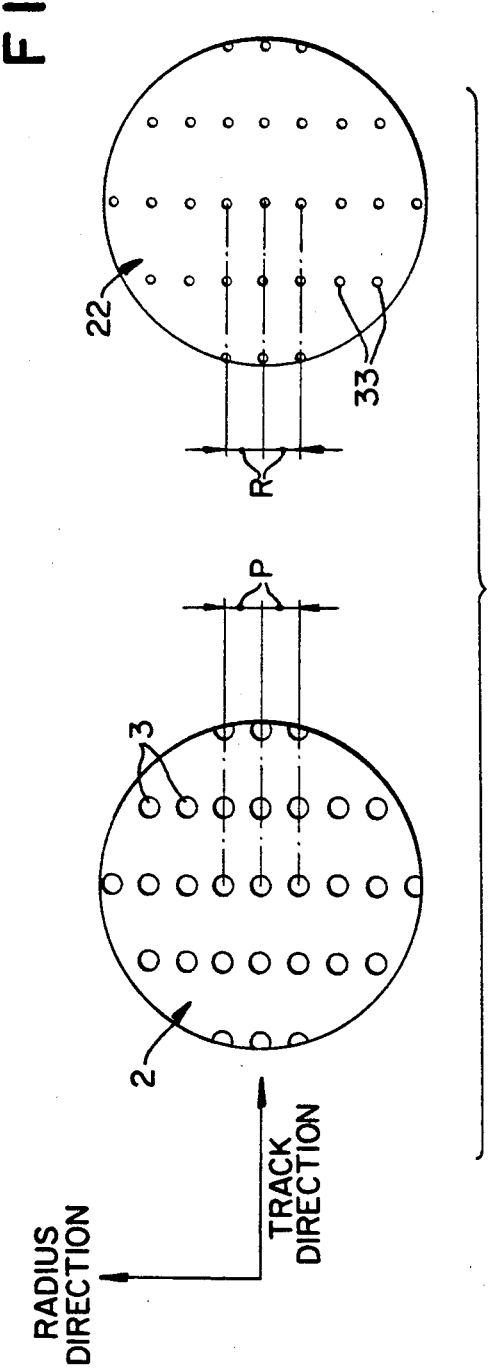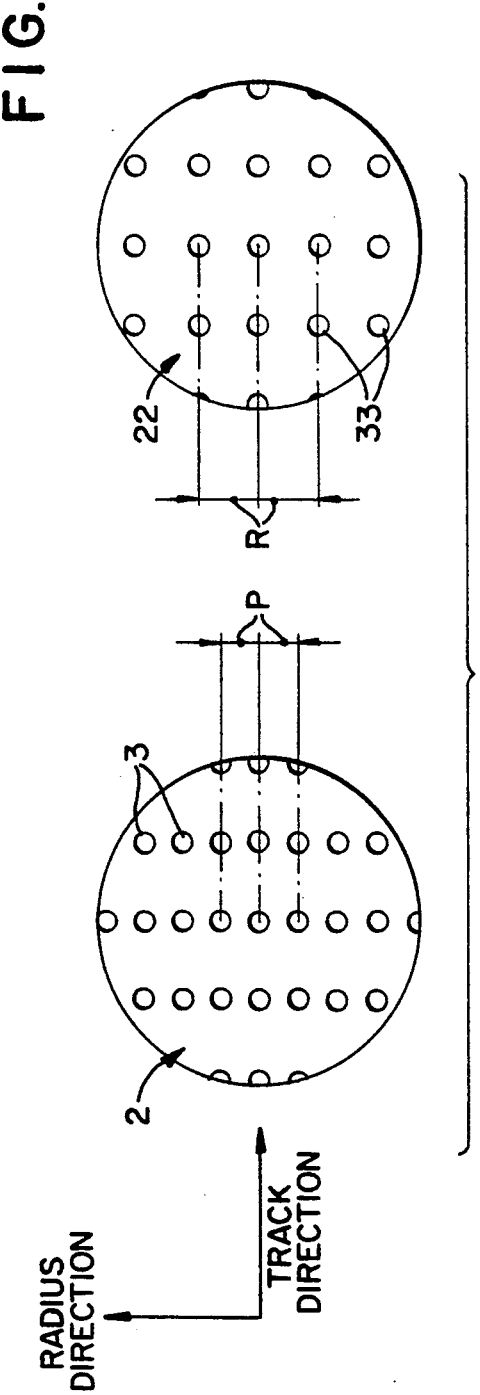

OPTICAL DISK WITH IDENTIFICATION PHASE-ENCODED AREA

BACKGROUND OF THE INVENTION

1. Field of the Invention

The present invention relates to an optical disk, and more particularly to an optical disk comprising a recording area and an identification phase-encoded part (PEP) area with pits from which system data on said optical disk is reproduced without tracking.

2. Discussion of the Background

At the present time, various studies are being conducted into the standardization of optical disks. Two types of optical disk systems have been proposed for this standardization. These are the Continuous Composite (CCS) and Discrete Block Format (DBF) systems.

The tracking method differs for these two systems. The CCS system uses the push-pull method, while the sample servo method has been adopted for DBF.

When the tracking methods differ, the drive must identify the type of optical disk from which data is to be reproduced and conform to that optical disk.

Therefore, with this standardization plan, an area called PEP (Phase-Encoded Part) is provided on the optical disk as an identification means so that system data can be reproduced from the disk without tracking.

On an optical disk used in this conventional system, the track pitch for the PEP area and the track pitch for the recording area are the same.

Accordingly, in reproducing data from the PEP area on this conventional optical disk without tracking, the reproduction of the data is readily influenced by the eccentricity of the optical disk. The problem therefore arises that large fluctuations in the signal from the PEP area (PEP signal) occur as a result of this eccentricity.

For this reason, track-on and track-off states occur during beam scanning as a result of the eccentricity of the optical disk. Therefore, the amplitude of the PEP signal (PEP amplitude) undergoes large changes.

Data read-out errors occur in an optical disk using a conventional system when data from the PEP area is reproduced because of the large variations in the PEP amplitude. There is also a strong possibility that the device will be unable to identify the type of optical disk. The system data therefore becomes unreliable, causing inconvenience because of the resulting low confidence.

SUMMARY OF THE INVENTION

Accordingly, an object of this invention is provide an optical disk on which the variation of the PEP signal is small so that data is reproduced with a stable PEP signal.

This object is achieved in the present invention by an optical disk comprising a recording area and a PEP area with pits from which system data on the disk is reproduced without tracking, wherein, when the track pitch for the PEP area and the track pitch for the recording area are the same, the relationship between the track pitch P in the PEP area and the width W of the pits measured at a height in the pit of half the pit depth D is set in the range:

$$0.4P \leq W \leq 0.6P$$

or, by an optical disk comprising a recording area and a PEP area with pits from which system data on the optical disk is reproduced without tracking, wherein the track pitch for the PEP area and the track pitch for the recording area are different, and the relationship between the track pitch P in the PEP area and the width W of the pits measured at a height in the pit of half the depth D is set in the range:

$$P \leq 2.5W.$$

According to the present invention, since the relationship between the track pitch P in the PEP area and a width W measured at a height in the pit of half the depth D is set in the range:

$$0.4P \leq W \leq 0.6P,$$

even when the track pitch for the PEP area and the track pitch for the recording area are the same, the width W of the PEP area pits is set so that a PEP signal variation range is obtained which satisfies the specified value for standardization.

In addition, according to the present invention, since the relationship between the track pitch P in the PEP area and a width W measured at a height in the pit of half the depth D is set in the range:

$$P \leq 2.5W,$$

even when the pit shape in the PEP area is uniform, the PEP area track pitch P is set so that a PEP signal variation range is obtained which satisfies the specified value for standardization.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 11 is a schematic fragmentary plan view of an optical disk wherein the track pitch for the PEP area is the same as the track pitch for the recording area; and FIG. 12 is a schematic fragmentary plan view of an optical disk wherein the track pitch for the PEP area is different from the track pitch for the recording area.

DESCRIPTION OF THE PREFERRED EMBODIMENTS

Figure 5:
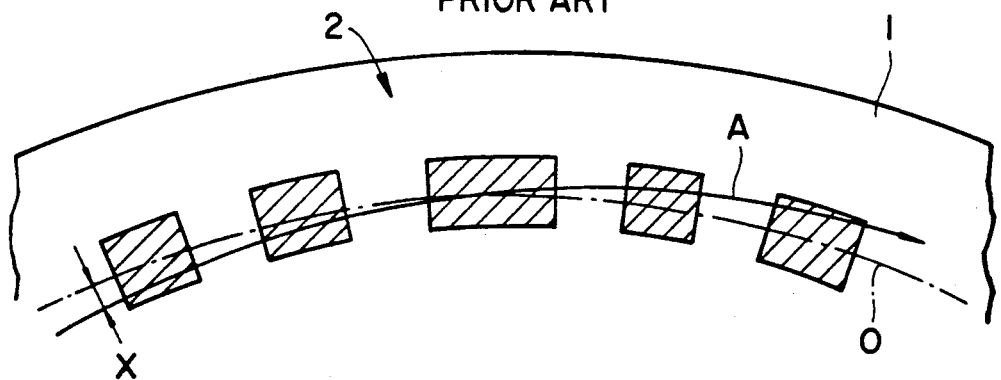
FIG. 5 is an enlarged schematic view of the PEP area of a conventional optical disk.

Referring now to the drawings, wherein like reference numerals designate identical or corresponding parts throughout the several views, and more particularly to FIG. 5 thereof, an optical disk 1 conforming to the present day standardization plan is provided with a PEP area from which system data on the disk is reproduced without tracking.

Figure 6:
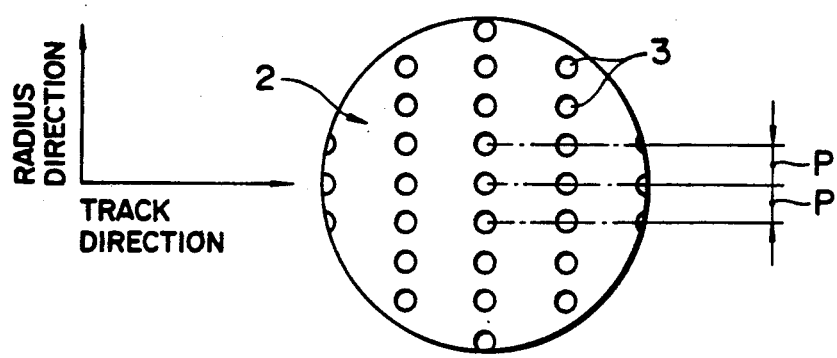
FIG. 6 is an enlarged plan view of the main parts of the PEP area of the conventional optical disk of FIG. 5.

As shown in the enlarged view of FIG. 6, in the PEP area 2, one track (in the horizontal direction in FIG. 6) is formed by a cluster of a plurality of pits 3 consisting of a cell of 561 to 567 PEP bits per revolution.

Figure 7:
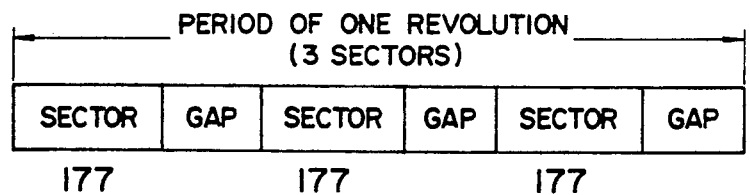
FIG. 7 is a schematic illustration showing the configuration of one track in the PEP area of the conventional optical disk of FIG. 5.
Figure 8:
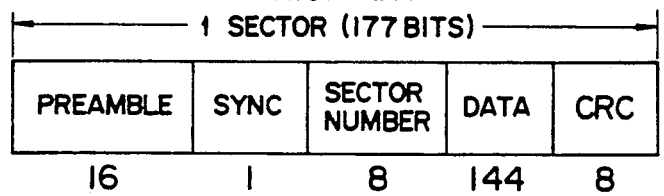
FIG. 8 is a schematic illustration showing the configuration of one sector of the track of FIG. 7.

Each of the tracks in the PEP area 2 has three sectors, as shown in FIG. 7. These sectors each have a region of 177 PEP bits.

In addition, three gaps, each of which is made up of a non-recording area of a length corresponding to 10 to 12 PEP bits, are formed between the sectors.

The respective sectors in the PEP area 2 each comprise a Preamble area of 16 bits, a Sync area of 1 bit, a Sector Number area of 8 bits, a Data area of 144 bits, and a CRC area of 8 bits.

The PEP area 2 of the optical disk 1, as described above, is subjected to a non-tracking scan by a read-out beam.

Both a track pitch P of the PEP area 2 (see FIG. 6) and a track pitch of the recording area (omitted from the drawing) are formed in the same manner.

Figure 9:
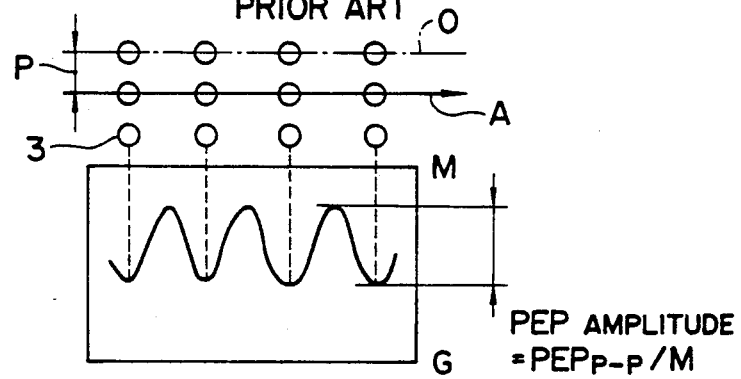
FIG. 9 and FIG. 10 are schematic illustrations showing the variations in the PEP signal resulting from the eccentricity of the conventional optical disk of FIG. 5.
Figure 10:
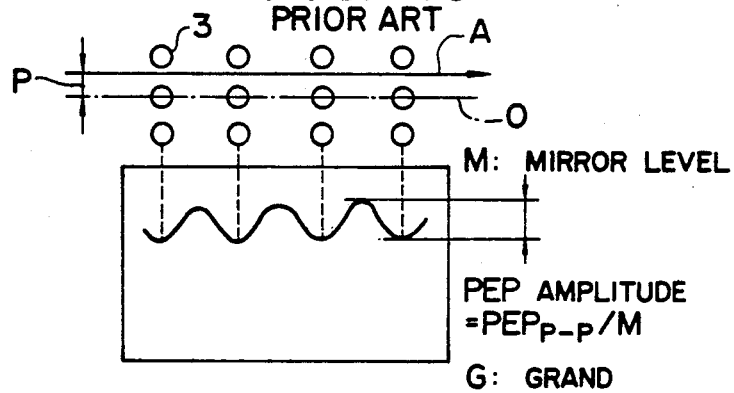

For this reason, in the case where the optical disk is rotating eccentrically during the scan of the PEP area 2, the scanning direction A of the read-out beam deviates with respect to the center O of the track of the PEP area 2, as shown in FIG. 5, and a track-on state (FIG. 9) and a track-off state (FIG. 10) are produced in the beam scan. This results in the inconvenience of variation in the magnitude of the PEP signal amplitude (PEP amplitude) as previously discussed.

Accordingly, starting with the premise that it would be possible to effectuate a stabilization of the PEP signal by adjusting the width of the pits 3 of the PEP area 2 without changing the track pitch P of the PEP area 2 with respect to the track pitch of the recording area, the inventor of the present invention implemented the following experiments.

Figure 1:
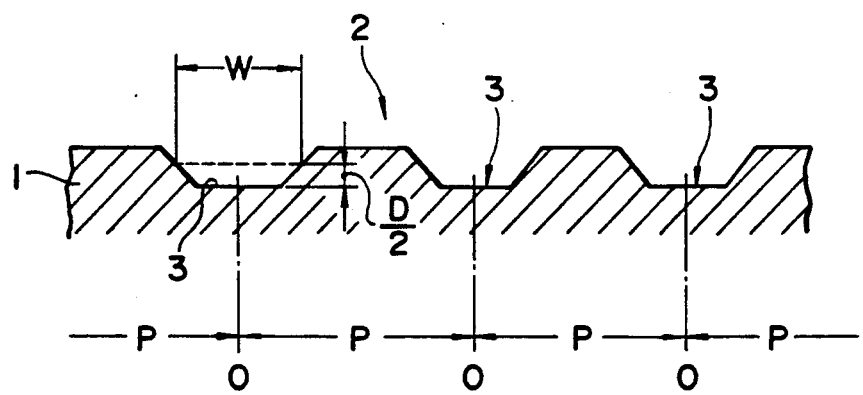
FIG. 1 is an enlarged cross-sectional view of the main portion of an embodiment of the optical disk of the present invention.
Figure 2:
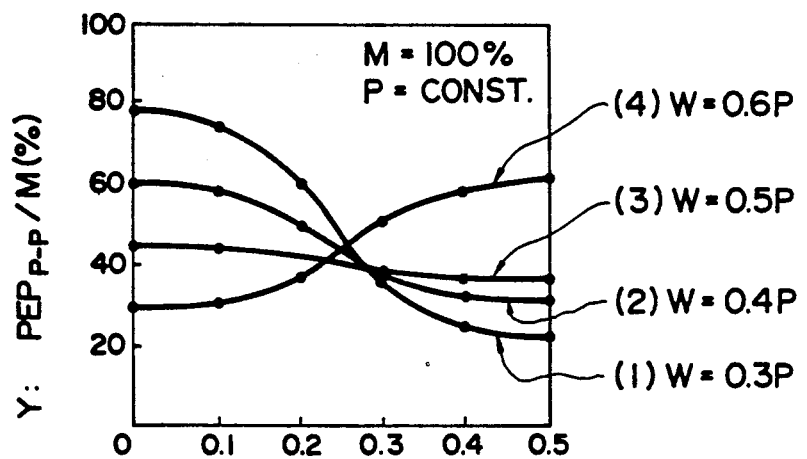
FIG. 2 is a diagram showing the relationship between the intervals from the center of the track of the optical disk of FIG. 1 to the scanning position of a read-out beam, and the PEP amplitude.

This embodiment is shown in FIG. 1 and FIG. 2.

The pitch P of the tracks of the PEP area 2 of the optical disk 1 in FIG. 1 is made constant, and the same as the pitch of the track of the recording area. For example, in the case of a CCS system optical disk with a track pitch P, P=1.6 μm. FIG. 11 shows portions of the PEP area 2 with pits 3 and recording area 22 with pits 33 of an optical disk in which the track pitch R for the recording area 22 and the track pitch P for the PEP area 2 are constant, and the same.

The widths W of each of the pits 3 in the PEP area 2 of the optical disk 1 were then variously changed, and the relationship between the interval x between the track center O of each track of the optical disk and the scan positions of the read-out beam (see FIG. 5), and the PEP amplitude y ($PEP_{p-p}/M$) was investigated using a computer simulation program.

The respective plots were made with the intervals x (xP) as abscissa and the PEP amplitudes y (%) as ordinate to obtain the graph shown in FIG. 2.

In FIG. 2, W=0.3P for the curve (1); W=0.4P for the curve (2); W=0.5P for the curve (3); and W=0.6P for the curve (4).

The width W for the pit 3, as shown in FIG. 1, is the half-width value of the depth D of the pit 3. Specifically, the width of the pit 3 is the value measured at ½ the depth D.

As can be clearly understood from FIG. 2, when x=0 on the curve (1), specifically, when the centers O of the tracks of the optical disk 1 are in agreement with the scanning position of the read-out beam, the PEP amplitude y is at a maximum in comparison with the other curves (2), (3), and (4). However, when x=0.5P, specifically, when the deviation between the center 0 of the track of the optical disk 1 and the scanning position of the read-out beam is at a maximum, the PEP amplitude y becomes a minimum on all the curves.

Specifically, the fluctuations in the amplitude of the PEP signal in the PEP area of the optical disk with specifications such as indicated in the curve (1) are large, and there is a tendency for read-out errors to be produced during data recovery.

On the other hand, when x=0 in the curve (4) the PEP amplitude y is small in comparison with the other curves. but when x=0.5P the PEP amplitude y is a maximum in all these curves.

Specifically, the fluctuations in the amplitude of the PEP signal in the PEP area of the optical disk with specifications such as indicated in the curve (4) are small, and there are no read-out errors produced during data recovery.

The fluctuation for the PEP signal in a standardized optical disk is in a range where the minimum value $\geq \frac{1}{2}$ the maximum value.

Accordingly, the optical disks with the specifications shown by the curves (2), (3), and (4) in FIG. 2 satisfy the conditions for a standardized optical disk. Specifically, these are optical disks for which the relationship between the track pitch P in the PEP area and a width W measured at a height in the pit of half the depth D is set in the range:

$$0.4P \leq W \leq 0.6P.$$

The foregoing embodiment is a specific example of an optical disk with a uniform track pitch P and a pit 3 of a width W. However, as previously discussed, it is possible to stabilize the PEP signal by adjusting the track pitch P while holding the pit shape, specifically, the width W of the pits 3, uniform.

Figure 3:
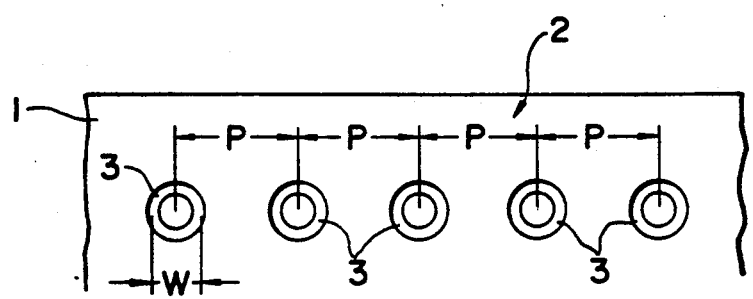
FIG. 3 is an enlarged fragmentary plan view of the main portion of another embodiment of the optical disk of the present invention.
Figure 4:
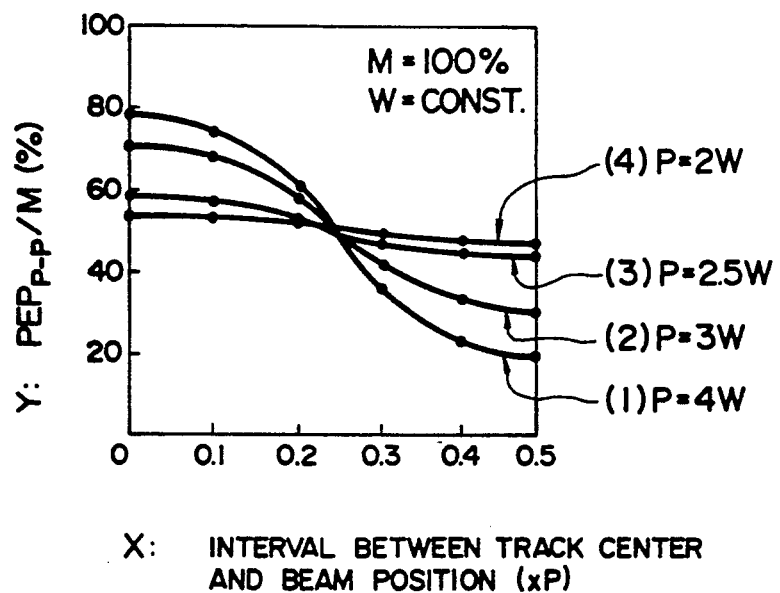
FIG. 4 is a diagram showing the relationship between the intervals from the center of the track of the optical disk of FIG. 3 to the scanning position of a read-out beam, and the PEP amplitude.

An embodiment based on this premise is illustrated in FIG. 3 and FIG. 4. FIG. 12 shows portions of the PEP area 2 with pits 3 and recording area 22 with pits 33 of an optical disk in which the track pitch R for the recording area 22 is different from the track pitch P for the PEP area 2.

In FIG. 3, the width W of the pits 3 in the PEP area 2 of the optical disk 1 was held constant and various changes were made in the track pitch P in the PEP area 2. Computer simulation was used to investigate the relationship between the interval x (see FIG. 5) between the centers 0 of the tracks of the optical disk and the scanning position of the read-out beam, and the PEP amplitude y ($PEP_{p-p}/M$).

The respective plots were made in the same manner as for the first embodiment with the intervals x (x P) as abscissa and the PEP amplitudes y (%) as ordinate to obtain the graph shown in FIG. 4.

In FIG. 4, P=4W for the curve (1); P=3W for the curve (2); P=2.5W for the curve (3); and P=2W for the curve (4).

The width W for the pit 3, as for the first embodiment, is the half-width value of the depth D of the pit 3. Specifically, the width of the pit 3 is the value measured at ½ the depth D (see FIG. 1).

As can be clearly understood from FIG. 4, when x=0 on the curves (1) and (2), specifically, when the centers 0 of the tracks of the optical disk 1 are in agreement with the scanning position of the read-out beam, the PEP amplitude y is large in comparison with the other curves (3) and (4). However, when x=0.5P, specifically, when the deviation between the center 0 of the track of the optical disk 1 and the scanning position of the read-out beam is at a maximum, the PEP amplitude y becomes small in comparison with the other curves.

Specifically, the fluctuations in the amplitude of the PEP signal in the PEP area of the optical disk with specifications such as indicated in the curves (1) and (2) are large, and, because there is a tendency for read-out errors to be produced during data recovery, the above-mentioned specifications for a standardized optical disk (minimum value $\geq \frac{1}{2}$ maximum value) are not satisfied.

As opposed to this, when x=0 in the curves (3) and (4), the PEP amplitude y is small in comparison with the above-mentioned curves. But when x=0.5P the PEP amplitude y of these curves is large in comparison with each of the above-mentioned curves.

Specifically, the fluctuations in the amplitude of the PEP signal in the PEP area of the optical disks with specifications such as indicated in the curves (3) and (4) are small, and there are no read-out errors produced during data recovery.

Accordingly, the optical disks with the specifications shown by the curves (3) and (4) in FIG. 4 satisfy the conditions for a standardized optical disk. Specifically, these are optical disks for which the relationship between the track pitch P in the PEP area 2 and the width W at a height in the pit of half the depth D is set in the range:

$$P \geq 2.5W$$

This second embodiment of the present invention not only provides an optical disk which conforms to standardized specifications based on the results of a computer simulation; almost identical results were obtained in actual tests, as confirmation.

In the optical disk of the present invention, the system data is reliably reproduced even when fluctuations resulting from the eccentricity of the optical disk are produced in the PEP area.

Accordingly, the optical disk of the present invention is highly reliable. No errors are produced in data read out from the PEP area.

Obviously, numerous modifications and variations of the present invention are possible in light of the above teachings. It is therefore to be understood that within the scope of the appended claims the invention may be practiced otherwise than as specifically described herein.

What is claimed is:

1. An optical disk comprising:
   a recording area and an identification phase-encoded area; said recording area and phase-encoded area each including information tracks with the same track pitch P formed in said recording area and said phase-encoded area;
   said information tracks of said phase-encoded area being formed with identification pits from which system data on said optical disk is reproduced, each of said identification pits having a width W which is measured at a height, in the pit, of half the depth of the pit;
   said width is set in the range: $0.4P \leq W \leq 0.6P$.

2. An optical disk comprising:
   a recording area and an identification phase-encoded area; said recording area and phase-encoded area each including information tracks with the track pitch R formed in said recording area being different from the track pitch P formed in said phase-encoded area;
   said information tracks of said phase-encoded area being formed with identification pits from which system data on said optical disk is reproduced, each of said identification pits having a width W which is measured at a height, in the pit, of half the depth of the pit;
   said width being set in the range: $P \leq 2.5W$.

* * * * *